June 13, 1950     W. L. MORRISON     2,511,733
RESTRICTOR
Filed Feb. 16, 1946     2 Sheets-Sheet 1
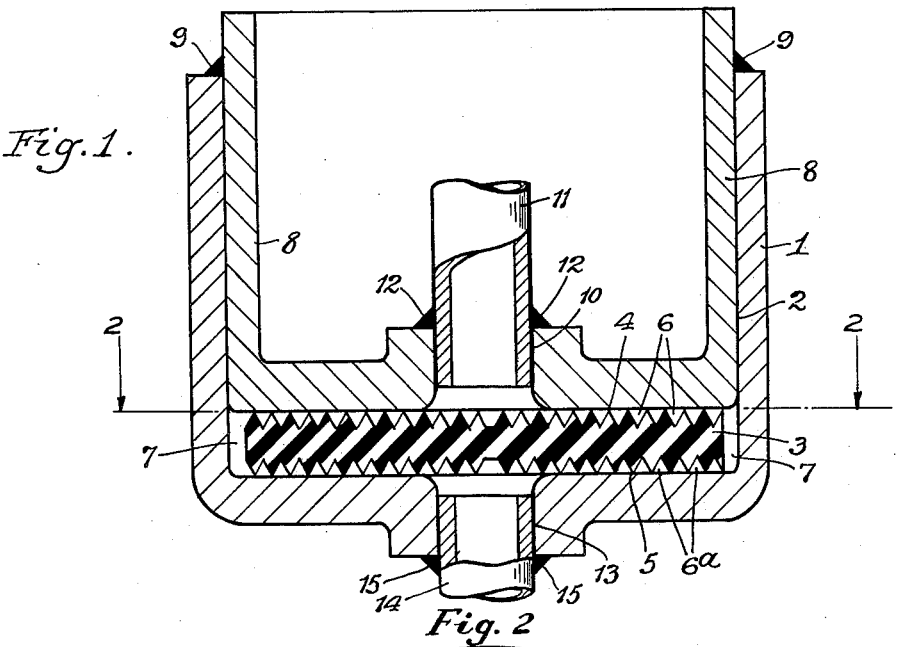
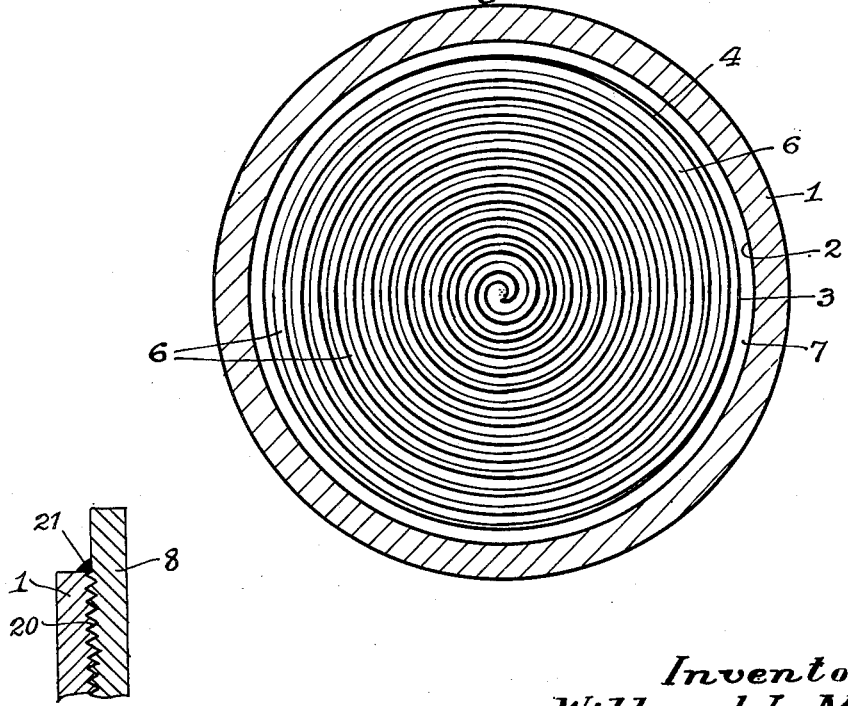
Inventor
Willard L. Morrison
by Parker & Carter
Attorneys June 13, 1950   W. L. MORRISON   2,511,733
RESTRICTOR
Filed Feb. 16, 1946   2 Sheets-Sheet 2

Inventor
Willard L. Morrison
by Parker & Carter
Attorneys.

Patented June 13, 1950

2,511,733

UNITED STATES PATENT OFFICE 2,511,733

RESTRICTOR

Willard L. Morrison, Lake Forest, Ill.

Application February 16, 1946, Serial No. 648,178

2 Claims. (Cl. 138—43)

My invention relates to an improvement in pressure reducing means.

One purpose is to obtain a pressure drop between two connecting tubes.

Another purpose is to utilize a spiral to provide a relatively great length of passage through which the fluid must travel in order to move from one tube to another.

Another purpose is to employ a spiral path on two sides of a body, such as a disc, to cause a reduction of a pressure in the fluid between the tubes.

Another purpose is to provide a restrictor that can be adjusted for various degrees of restriction.

Other purposes will appear from time to time in the course of the specification and claims.

I illustrate the invention more or less diagrammatically in the accompanying drawings wherein:

Fig. 1 is an axial section;

Fig. 2 is a section on the line 2—2 of Fig. 1;

Fig. 3 is a detail;

Like parts are indicated by like symbols throughout the specifications and drawings.

Figure 4:
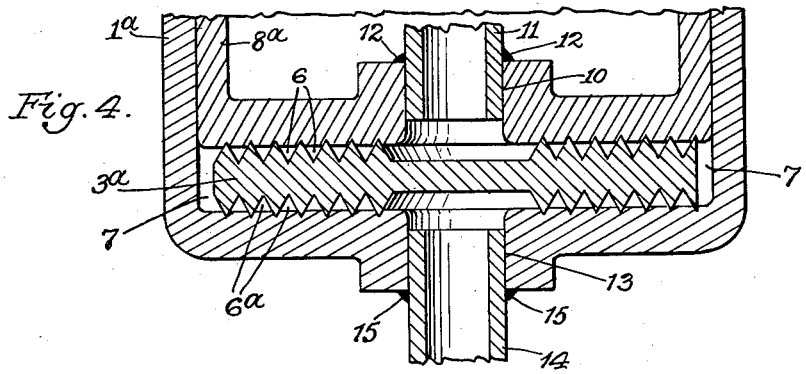
Fig. 4 is a view similar to Fig. 1, illustrating the use of a different material.

Referring to the drawing I illustrate a cup 1 of aluminum or any other suitable material, with an internal cylindrical walled cavity 2. Within this cylindrical cavity 2 is a restrictor body 3, which may be of various shapes but is illustrated as a disc of a deformable substance, shown as a rubber substitute in Fig. 1, having its upper and lower faces 4 and 5, grooved with spiral passages 6, 6a. This disc or body 3 is of smaller diameter than the inner cylindrical face 2 of the cup 1 leaving a space 7 between the disc 3 and the inner wall 2. Press fitted within cavity 2 is a cup 8 that can be adjusted to varying degrees of thrust against the lower face of the disc 3, the two faces 5 and 4 of the disc 3 opposing the adjacent faces of the ends of the cups 1 and 8.

In the form of Figure 1 the disc or body 3 is illustrated as of deformable material, such as a rubber substitute, resistant to the fluid with which the restrictor is employed. When the cups are thrust together, the passages shown at 6a have their cross sectional area controlled by the distortion of the material of the member 3. Whereas I have illustrated rubber or a rubber substitute in Figure 1, it will be realized that any suitable metal may be employed, such as copper or any other metal which is softer than metal of the opposed faces of the cup ends. In the form of Figure 4 the restrictor body 3a is shown as of harder material than the opposed faces of the cup end walls 1a and 8a respectively. Thus, when the two cups are thrust together, the preferably shaped edged passage walls in the faces of the body 3a enter the opposed cup ends. In either event the result of a thrusting together of the two cups is to vary the effective cross-sectional area of the passages 6 and 6a.

In Figure 1 I illustrate the telescoping cup walls as smooth. Any suitable tool, not herein shown, may be employed for exerting the desired thrust. The cups are then soldered or otherwise secured together as at 9. It will be understood that the cups may be threaded together as shown at 20 in Figure 3, the thrust being obtained or varied by relative rotation of the two cups. The cups may then be soldered or otherwise secured together as at 21.

The cup 1 is shown as secured to a duct 14, which is received in the inlet passage 13 and welded or soldered, as at 15. Similarly, the opposite duct 11 may be secured to the inner cup 8 by penetrating the passage 10, the parts being welded or soldered as at 12. It is advantageous, although not strictly necessary, to provide a coaxial relationship between the cups and the ducts. One of the ducts serves as an inlet duct and the other as an outlet duct, it being immaterial as to which direction of flow is maintained. The fluid flows inwardly through one duct, then passes spirally outwardly along one of the passages to the space 7, and spirally inwardly to the opposite duct. The result is a passage of substantial length and small cross-sectional area, the area being preferably established by a factory setting.

Figure 5:
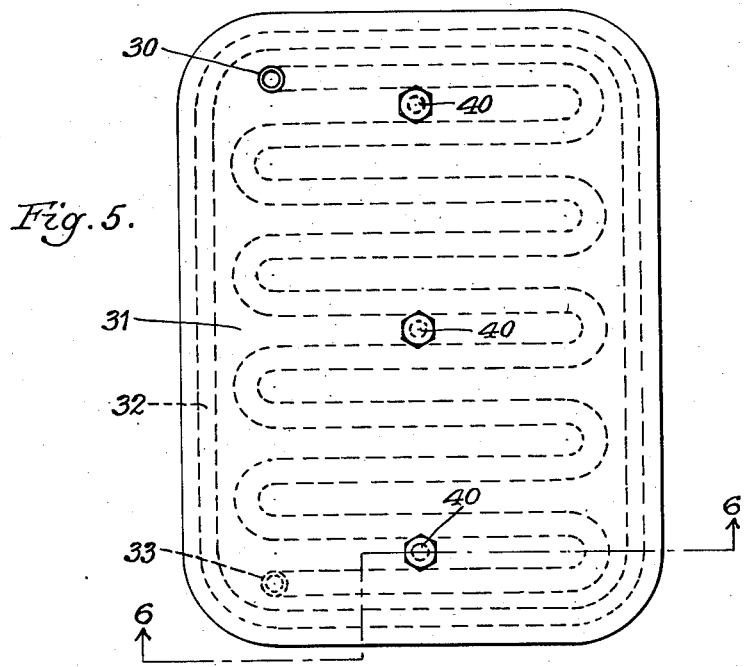
Fig. 5 is a plan view of a variant form.
Figure 6:
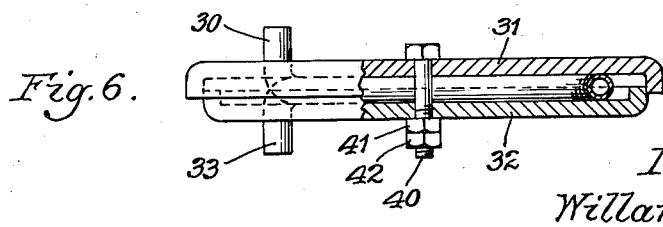
Fig. 6 is a section on the line 6—6 of Fig. 5.

In the form of Figures 5 and 6 I illustrate a duct 30 extending to a pressure member 31 and a duct 33 extending from the opposite pressure member 32. Extending between the two ducts I illustrate a tube which may for example be of a relatively soft material or metal, such as copper. The tube may be originally cylindrical, and may be flattened or deformed by a thrust of one of the pressure members against the other. The thrust may be obtained in any suitable manner, but I illustrate bolts 40, nuts 41, and lock nuts 42.

In all the forms of my invention I provide a passage of relative small cross-sectional area and great length, which may be controlled or set to a desired cross-sectional area by the exertion of pressure against a wall or walls of the duct, or by the deformation of a bounding surface of the duct.

It will be realized that whereas I have shown and described an operative device, still many changes might be made in the size, shape, number, arrangement and disposition of parts without departing materially from the spirit of my invention. I wish, therefore, that my showing be taken as in a broad sense as diagrammatic and illustrative, rather than as a limitation to my precise showing.

For example whereas it may be advantageous to employ a disc such as shown in Figures 1 and 2.

The use and operation of my invention are as follows:

It is desirable, for example in refrigeration, to employ pressure reducing or restrictor devices for causing a pressure drop in the course of the flow of the refrigerant. I illustrate a simple and compact restrictor in which the cross-sectional area of the restricting passage can be readily set or controlled. If desired, the restrictor device may be made adjustable, as by use of the screw threads 20 of Figure 3, so that, if the restrictor passage is of unduly large cross-sectional area it may later be reduced.

I claim:

1. In a pressure-reducing device for fluids, an inlet duct, an outlet duct, a deformable restricting element in the line of flow between said inlet and outlet ducts, said restrictor element having a tortuous passage formed in the face thereof, and means for subjecting said restrictor element to deforming pressure and for thereby varying the effective cross-sectional area of said passage, and means for maintaining the pressure on the restrictor element constant, independent of changes in the pressure of the fluid in the inlet and outlet ducts.

2. In a pressure-reducing device for fluids, an inlet duct, an outlet duct, a deformable restricting element in the line of flow between said inlet and outlet ducts, said restrictor element having a tortuous passage formed in the face thereof, and means for subjecting said restrictor element to deforming pressure and for thereby varying the effective cross-sectional area of said passage, and means for maintaining the pressure on the restrictor element constant, independent of changes in the pressure of the fluid in the inlet and outlet ducts, the means for subjecting the restrictor element to deforming pressure including surfaces adapted to engage that element, which are harder than the element itself.

WILLARD L. MORRISON.

REFERENCES CITED

The following references are of record in the file of this patent:

UNITED STATES PATENTS

| Number | Name | Date |
|---|---|---|
| 540,270 | Parker | June 4, 1895 |
| 1,964,300 | Perry et al. | Jan. 26, 1934 |
| 1,983,227 | Hall et al. | Dec. 4, 1934 |
| 2,289,905 | Dasher | July 14, 1942 |